US006783135B1

(12) United States Patent
Nord

(10) Patent No.: US 6,783,135 B1
(45) Date of Patent: Aug. 31, 2004

(54) TRANSFORMABLE INFANT TRANSPORTER

(76) Inventor: Lydia J. Nord, 367 Windward Dr., Elyria, OH (US) 44035

(*) Notice: Subject to any disclaimer, the term of this patent is extended or adjusted under 35 U.S.C. 154(b) by 119 days.

(21) Appl. No.: 10/109,080

(22) Filed: Mar. 29, 2002

(51) Int. Cl.$^7$ ................................................ B62B 7/02
(52) U.S. Cl. ..................... 280/30; 280/47.25; 280/655
(58) Field of Search .......................... 280/30, 643, 644, 280/645, 647, 648, 650, 652, 655, 658, 47.2, 47.25, 47.38, 47.4

(56) References Cited

U.S. PATENT DOCUMENTS

| | | | | |
|---|---|---|---|---|
| 3,336,039 A | * | 8/1967 | Chute et al. ................. | 280/643 |
| 3,549,164 A | * | 12/1970 | Raynor ......................... | 280/30 |
| 4,229,039 A | * | 10/1980 | Day ............................. | 297/232 |
| 4,239,259 A | * | 12/1980 | Martinez ..................... | 280/649 |
| 4,335,900 A | * | 6/1982 | Fleischer .................... | 280/649 |
| 4,610,460 A | * | 9/1986 | Kassai ......................... | 280/650 |
| 4,620,711 A | * | 11/1986 | Dick ............................ | 280/30 |
| 4,685,688 A | * | 8/1987 | Edwards ...................... | 280/30 |
| 4,786,064 A | | 11/1988 | Baghdasarian | |
| 5,230,523 A | * | 7/1993 | Wilhelm ...................... | 280/30 |
| 5,398,951 A | * | 3/1995 | Ryu ............................. | 280/30 |
| 5,823,547 A | | 10/1998 | Otobe et al. | |
| 6,070,890 A | | 6/2000 | Haut et al. | |
| 6,092,817 A | * | 7/2000 | Kilmer ........................ | 280/47.26 |
| 6,357,784 B1 | * | 3/2002 | Mitzman ..................... | 280/642 |
| 2002/0060444 A1 | * | 5/2002 | Cote ........................... | 280/648 |
| 2003/0209885 A1 | * | 11/2003 | Szmidt et al. ............... | 280/652 |

FOREIGN PATENT DOCUMENTS

| | | | | | |
|---|---|---|---|---|---|
| JP | 52-44932 | * | 4/1977 | ............. | 280/47.25 |
| SU | 759380 | * | 9/1980 | ............. | 280/47.25 |

* cited by examiner

Primary Examiner—Frank Vanaman
(74) Attorney, Agent, or Firm—Joseph H. Taddeo

(57) ABSTRACT

An improved lightweight two-wheeled infant conveyance for traveling with a child, that can be stored in a confining area or easily carried on a staircase, escalator, through revolving doors on an airliner or other public transportation. The present invention comprises an infant-chaise having a retractable handle, to permit transformation into a portable, compact unit. When transformed for use in a car seat, the present invention allows the conveyance apparatus to be installed having the child facing either in the forward or rear direction. A second embodiment of the present invention relates to a baby conveyance two-wheeled frame is suitable for transporting a baby in a carrier being supported on a transformable folding frame or being portably carried by its handle, and the handle also serving as to prop the foldable frame; wherein the frame folds into a compact arrangement ready for unfolding for use as an infant transporter.

13 Claims, 6 Drawing Sheets

TRANSFORMABLE INFANT TRANSPORTER

FIELD OF INVENTION

The present invention relates primarily to an infants seat, one of which is transformable from a portable stroller to an infant car seat and more particularly to a transformable infant transporter having two wheels.

BACKGROUND OF THE INVENTION

Today, there are many types of infant strollers, baby carriers, and car seats available for use in transporting a child safely. As used as a stroller, all have two axles, with two wheels mounted at both ends of each axle. Even though this configuration provides for a stable base upon which is mounted a seat, the size and subsequent weight of the unit is generally substantial, even when in the compact, folded position.

As such, many baby carrier systems are occasionally carried themselves and can become quite tiresome when carrying them for long, extended periods of time. Some baby carriers are included as a portion of a child travel system, which can transport the baby in the carrier on the stroller base, but are extremely large and awkward when used during the infant's first stage of life.

Examples of such prior art are shown in the examples that follow.

U.S. Pat. No. 4,786,064, granted Nov. 22, 1988, to V. G. Baghdasarian, discloses an infant seat that converts from a car seat into a stroller. The infant seat comprises a chair that is connected to a wheel frame on which the a wheel set is mounted; the wheel set comprising a pair of axially mounted front wheels and a pair of axially mounted rear wheels. When the wheel set is stowed below or behind the chair, automobile safety belts threaded through the wheel frame support the chair in either a front facing or in a rear facing direction. To convert the car seat into a stroller, the wheel frame rotates about its pinned connections to the chair to deploy the linked front and rear wheels. A handle lock secures the handle in a variety of positions.

U.S. Pat. No. 5,823,547, granted Oct. 20, 1998, to T. Otobe, et al., discloses a child safety seat that can be used as an auxiliary seat in an automobile and in a stroller. The child safety seat has front and rear caster arms that are rotatably provided in a seat structure. The front and rear caster arms extend selectively downward from and retract above the lowermost portion of the seat structure. The child safety seat can be attached to the automobile seat when the front and rear caster arms retract.

U.S. Pat. No. 6,070,890, granted Jun. 6, 2000, to R. E. Haut, et al., discloses a an infant carrier that includes a provision that will allow an infant carrier to conveniently be mounted to either a stroller or a base. The infant carrier also includes an actuator that operates both the stroller and base releasing mechanisms.

All of the above referenced prior art disclose infant strollers, car seats and baby carriers for safely conveying and transporting a small child or infant As such, when used as a stroller, each configuration includes two pair or sets of axially mounted wheels. This configuration allows for a large footprint, which occupies a considerable area when in use.

What is needed is means of transporting a baby, an infant or a young child safely, using a conveyance that is more portable and one that can be stored more conveniently.

It is therefore an object of the present invention to provide for an infant conveyance apparatus that provides a safe means of transporting a baby, an infant, or a young child.

It is another object of the present invention to provide for an infant conveyance apparatus that has a retractable handle for case in transporting a baby, an infant, or a young child.

It is still another object of the present invention to provide for an infant conveyance apparatus that is capable of being transformed from a portable two-wheeled conveyance apparatus into a car seat, one that can be transformed to having the child facing forward, or facing rearward.

It is still yet another object of the present invention to provide for an infant conveyance apparatus that is capable of being transformed from a portable two-wheeled conveyance apparatus into a compact carry-on piece of luggage.

It is a final object of the present invention to provide an infant conveyance apparatus that is capable of being transformed from a portable two-wheeled conveyance apparatus into a compactly carried piece of luggage, one that is substantially reduced in weight and one that occupies a reduced footprint area.

A better understanding and appreciation of these and other objects and advantages of the present invention will be obtained upon reading the following detailed description of the preferred embodiment when taken in conjunction with the accompanying drawings.

SUMMARY OF THE INVENTION

The present invention relates primarily to an infant conveyance apparatus, one that can find greater application and use in today's world of modem travel.

Energy conservation has resulted in the various modes of transportation, such as the airlines, trains and buses, to become more efficient in operation by (1) reducing the weight carried by each traveler in the way of clothing and goods, and (2) by reducing the space that each passenger and their luggage occupy. To an airline, for example, a reduced passenger and freight payload that occupies a smaller area, results in increased a greater efficiency, thereby reducing the passenger mile cost.

Thus far, there has been little consideration given to transporting an infant through an airline, train or bus terminal or even taking a small child to a sports event, or to a recreational park or museum, or taking a child with you on a vacation trip overseas.

Today's infant strollers and baby carriers are bulky, awkward and heavy should one wish to store it in the trunk of an automobile or to carry it onboard an airliner.

To overcome the deficiencies of the current designs, the present invention is directed toward a two-wheeled infant transporter that is lightweight, safe for carrying the infant, and is capable of being transformed and adapted for use in a modem automobile as an infant car seat.

The present invention comprises an infant-chaise having a retractable handle, to permit transformation into a portable, compact unit when being stored. It is configured for having a single axle with two wheels, one mounted at each end of the axle.

When transformed for use in a car seat application, the present invention allows the conveyance apparatus to be installed where either the infant is facing in the forward direction or the infant is facing in the rear direction.

A second embodiment of the present invention relates to a baby conveyance, one that is suitable for transporting a baby in a carrier; the carrier being supported upon a transformable two-wheeled foldable frame or by being portably carried by its handle, and the handle also serving as to prop the foldable frame, when used as a two-wheeled transporter.

BRIEF DESCRIPTION OF THE DRAWINGS

The present invention is pictorially illustrated in the accompanying drawings that are attached herein.

DETAILED DESCRIPTION OF THE INVENTION

Figure 1:
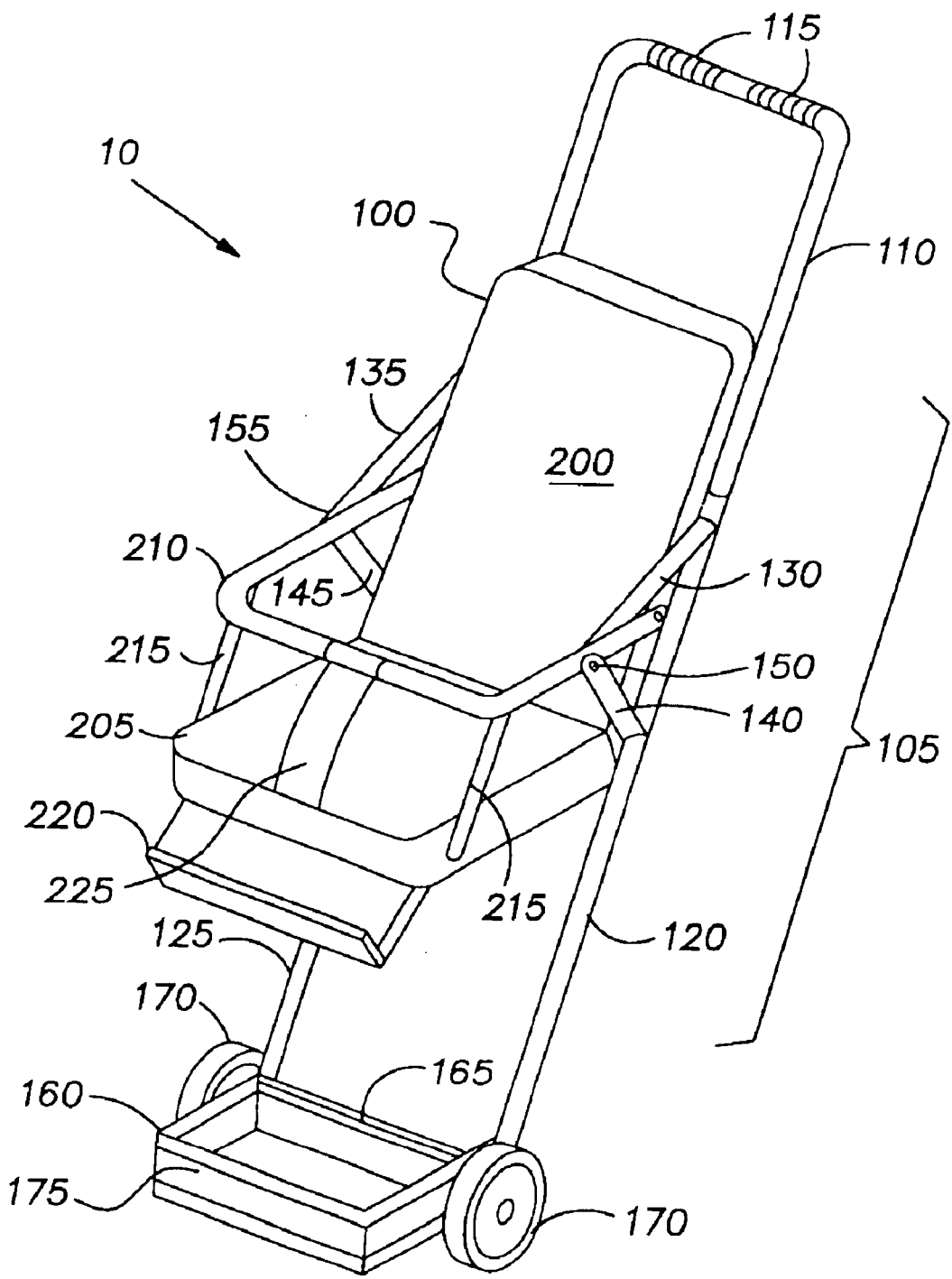
FIG. 1 is a perspective view of the present invention, comprising a novel transformable infant transporter adapted and transformed for use as a two-wheeled conveyance.
Figure 9:
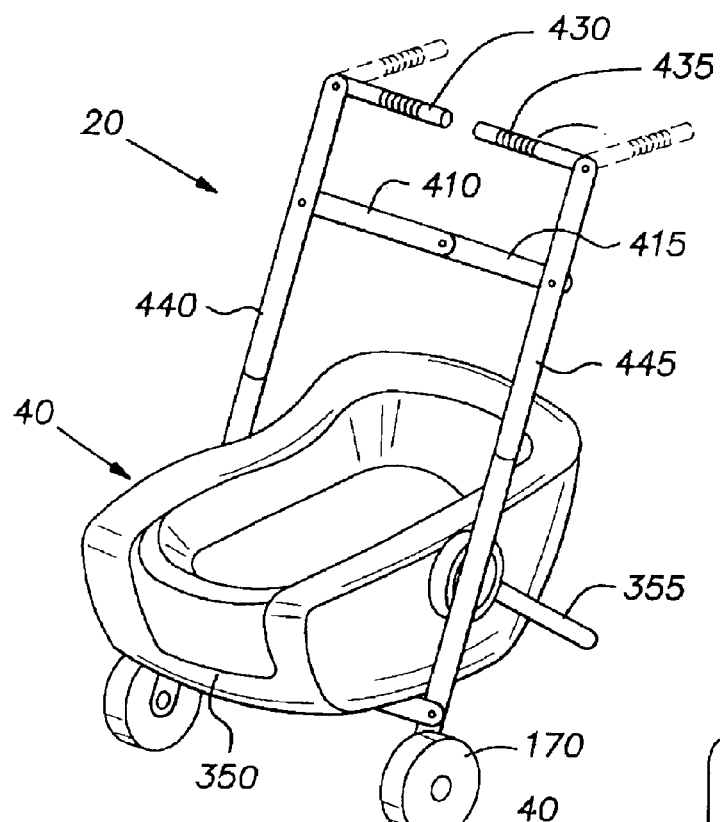
FIG. 9 is a perspective view of the transformable two-wheeled infant transporter with the baby carrier mounted upon the foldable frame.
Figure 10:
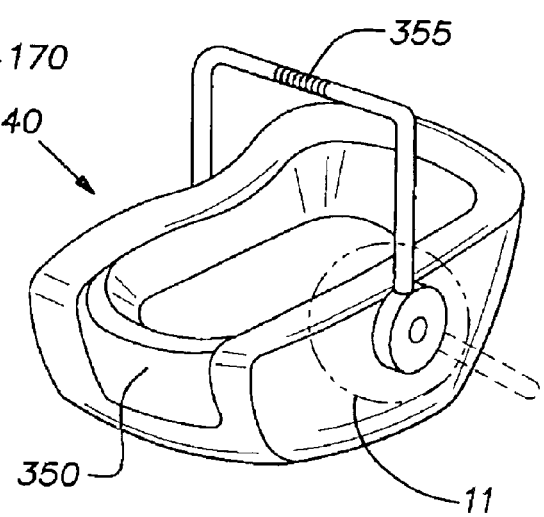
FIG. 10 is a perspective view of the baby carrier with its carrying handle in the upright position.

For the purposes of illustration, as shown in the accompanying drawings, the present invention is primarily embodied in a two-wheeled transformable infant stroller 10, shown in FIG. 1 and secondarily embodied in a baby transporter 20 having a compact foldable two-wheeled supporting frame 30, and removable baby carrier 40, as shown in FIGS. 9 and 10.

Referring first to FIG. 1, there is shown a perspective view of the two-wheeled transformable infant stroller 10. A foldable juvenile chaise 100 and the supporting transformable frame 105 comprise the two-wheeled stroller 10.

The supporting transformable frame 105 is comprised of a retractable handle 110 that is inserted into tubes 120 and 125, thereby allowing the handle to be protracted to full length for convenient use. A pair of cushioned handle grips 115 accompanies the handle portion 110 to facilitate in propelling the infant stroller 10. It will be understood that the first tube pair 120 and 125, and the second tube pair 110 of the handle portion, have a sufficient frictional fit, whereby the handle 115 will remain in a contracted telescope arrangement with the first tube pair 120 and 125, when the conveyance is not in use and when in use, the handle is frictionally held in the extended position with the handle portion 110 slidably extended to its protracted full length.

Attached to the upper portion of tubes 120 and 125 are the upper support arms 130 and 135 that extend forward, joining with the lower support arms 140 and 145, meeting at pivots 150 and 155 at each junction of the upper and lower support arms, respectively.

A base 160 is located at the extreme lower end of tubes 120 and 125, which pivots about the axle 165. A bracket having a manually locking detent (not shown) permits the base 160 to remain stationary in either the fully open or fully closed position. In the fully open position, as shown in FIG. 1, the base 160 is orthogonal to the frame 105, thereby allowing the stroller to remain in a stable upright position, not tipping in a forward direction. Secured to each end of the axle 165 are the two rubber-tired wheels 170.

Figure 7:
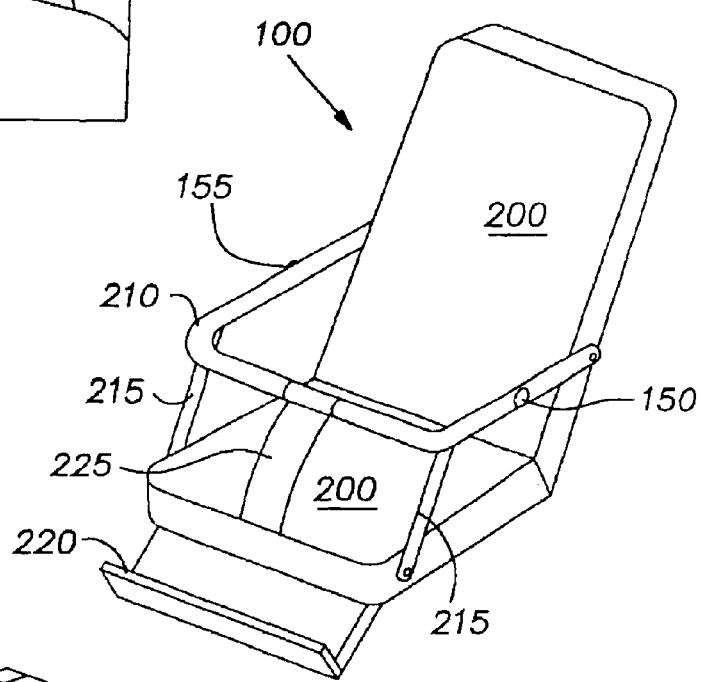
FIG. 7 is a perspective view of the foldable seat of the transformable infant transporter.

As shown in FIG. 1, and additionally, in FIG. 7, the foldable juvenile chaise 100 is comprised of the rear cushion 200, the cushioned seat 205, where the seat is encompassed by the child restraining member 210. The seat stabilizing bars 215 are located on both sides of the cushioned seat 205, connecting to the restraining member 210 and forming a parallelogram, where the restraining member 210 remains parallel to the seat 205 and each stabilizing bar 215 remains parallel to the rear cushion 200 for any position of the chaise, whether it is in an upright position or in a reclining position of FIG. 3. Attached to the under portion of the seat 205 is the footrest 220. A center restraint 225 is a common safety device: a safety device that prevents the child from sliding beneath the restraining member 210.

Figure 2:
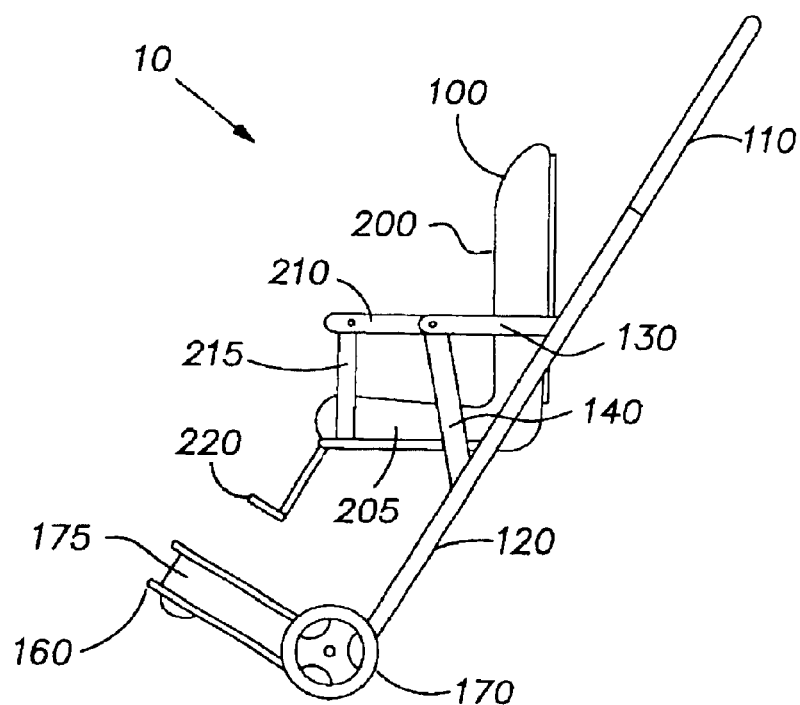
FIG. 2 is a side elevational view of the transformable infant transporter with the repositionable chaise in an upright position.

Turning now to FIG. 2, there is shown the two-wheeled infant transporter 10 inclined in such a position as if it were being used to transport an infant, where the repositional chaise 100 is maintained in an upright position.

Figure 3:
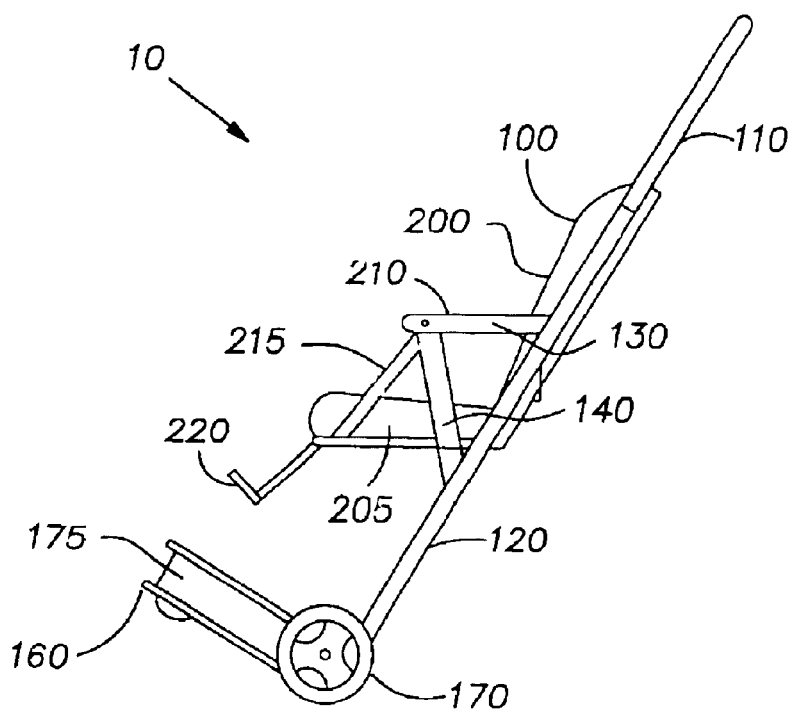
FIG. 3 is a side elevational view of the transformable infant transporter with the repositionable chaise in a reclined position.

As shown in FIG. 3, the two-wheeled infant transporter 10 remains inclined in such a position as if it were being used to transport an infant, however, the chaise 100 is repositioned so that the infant is in a reclined position.

Figure 4:
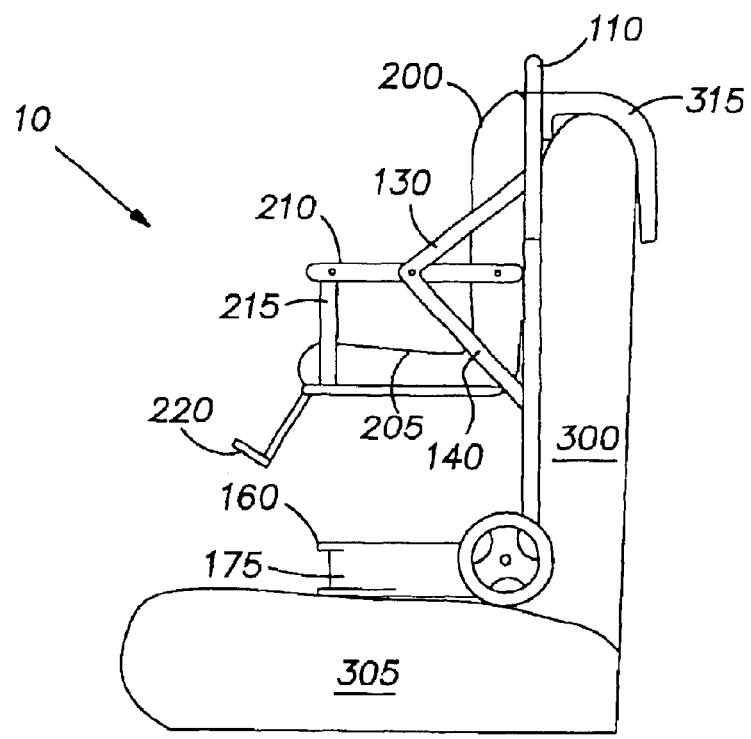
FIG. 4 is a side elevational view of the transformable infant transporter installed and mounted in a front-facing position on an automotive seat.
Figure 5:
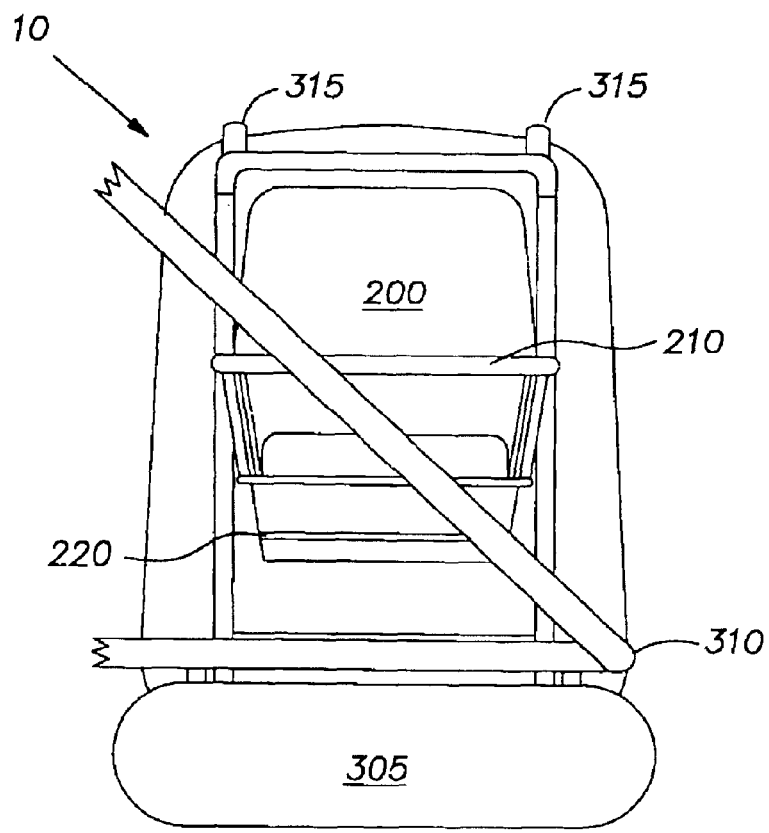
FIG. 5 is a front elevational view of the transformable infant transporter installed and mounted in a front-facing position on an automotive seat using a lap and shoulder safety seat belt.

FIGS. 4 and 5 show the two-wheeled infant transporter 10 adapted for use as a front facing child's car seat. This front facing position is most desirable when installed in the rear compartment of an automobile, where there in no danger to the child should the air bags be deployed. In this configuration, the handle 110 is retracted into tubes 120 and 125 and the backrest cushion hooks 315 are unfolded, and then placed over the backrest cushion 300. The automobile's seat belt 310 (as shown in FIG. 5) can pass in the base's safety seatbelt channel 175 to anchor transporter 10, thereby safely securing it to the auto's seat.

Figure 6:
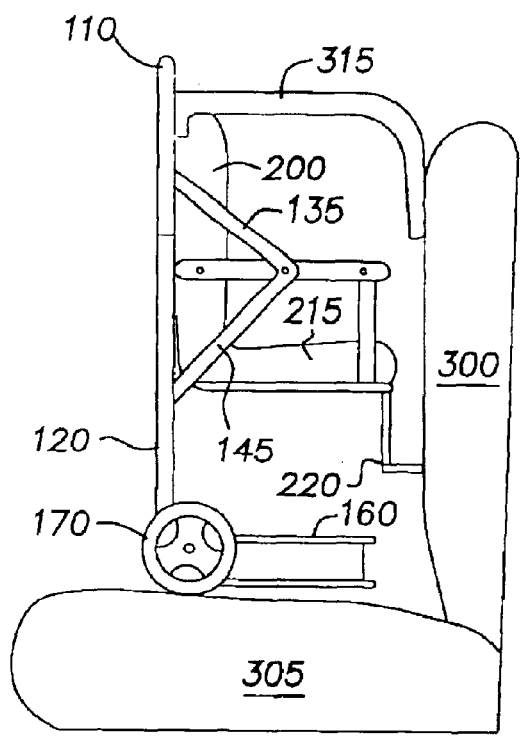
FIG. 6 is a side elevational view of the transformable infant transporter transformed and mounted in a rear-facing position on an automotive seat.

FIG. 6 shows the two-wheeled infant transporter 10 adapted for use as a child's car seat that faces the child towards the rear. This rear facing position is most desirable when installed in the front compartment of an automobile, to avoid serious injury to the child in the event the airbags are deployed. In this configuration, the handle 110 is retracted into tubes 120 and 125 and the backrest cushion hooks 315 are unfolded, and then placed against automobile backrest cushion 300. The automobile's seat belt 310 (as shown in FIG. 5) can then pass past the tubes 120 and 125, over the top of the wheels 170 to secure the transporter 10.

Figure 8:
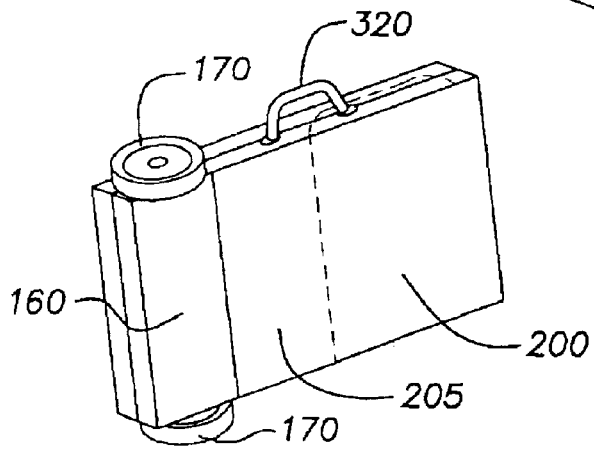
FIG. 8 is a perspective view of the transformable infant transporter transformed into a foldable case that can be carried on a flight or folded for compact storage.

FIG. 8 shows the entire transformable infant stroller 10, transformed into a compact portable assembly that can easily be carried onto an airliner, a train, or bus. In this transformation, the handle 110 is retracted into tubes 120 and 125 and the rear cushion 200 and the cushioned seat 205 are extended longitudinally by compressing the parallelogram formed by the child restraining member 210, the stabilizing bars 215 and the seat components 200 and 205. The base 160 is subsequently rotated 90 degrees, thereby completing the transformation. A handle 320 permits the ease in carrying the transformed stroller.

A second embodiment of the baby transporter 20 of the present invention, having a compact foldable two-wheeled supporting frame 30, and a portable baby carrier 40, is shown in FIG. 9.

Figure 11:
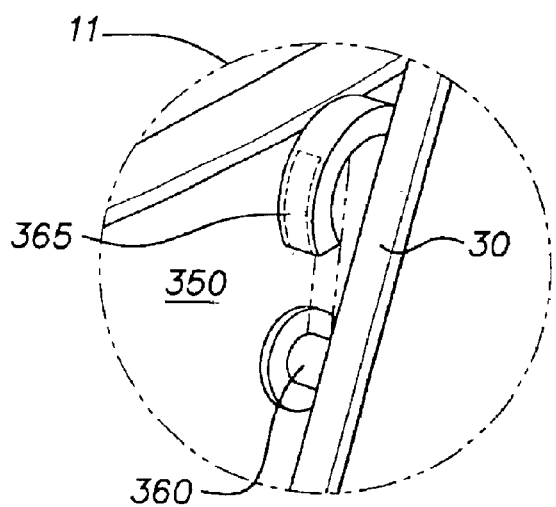
FIG. 11 is a detailed enlarged view of the supporting boss and the carrier engaging recess of the baby carrier and the foldable frame of the transformable two-wheeled infant transporter.

FIGS. 9 and 10 detail the baby transporter 20 of the second embodiment of the present invention. The baby carrier 40 is comprised of the padded shell carrier 350, having a handle 355 and a connection mechanism 11, as shown in FIG. 11. The carrier handle 355 not only serves as a convenient handle with which to carry the baby carrier 350 when removed from the transporter frame 30, but also serves as a prop stand, when rotated clockwise about 120 degrees, to support the transporter 20 if it is not in use. A pawl-like detent (not shown) maintains the carrier handle 355 in either the upright position for ease in carrying (shown in FIG. 10) or rotated downwardly to the prop stand position, as shown in FIG. 9.

FIG. 11 details the attachment means for supporting the carrier recess 365 of the carrier shell 350 upon the frame pins 360 of the foldable frame 30.

Figure 12:
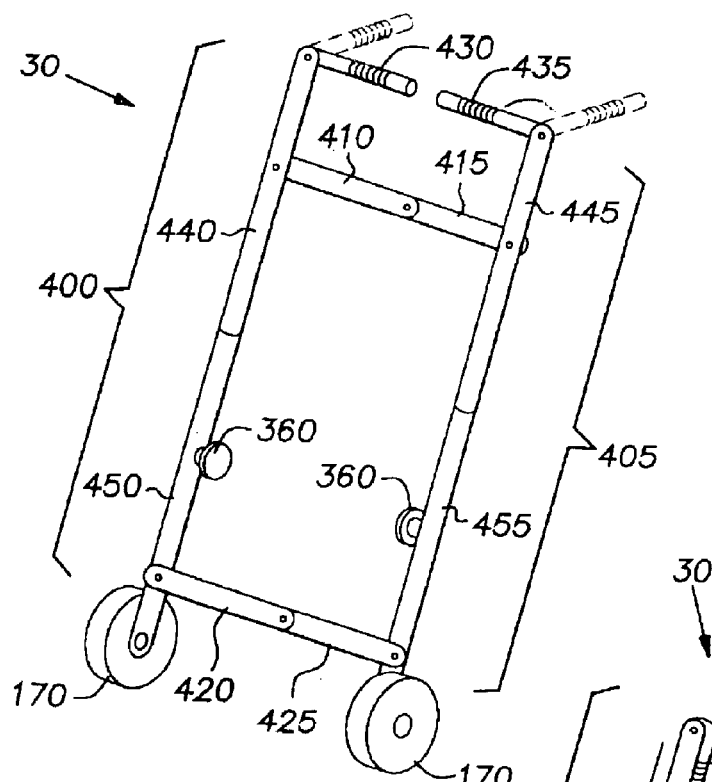
FIG. 12 is a perspective view of the transformable two-wheeled infant transporter with the baby carrier removed.
Figure 13:
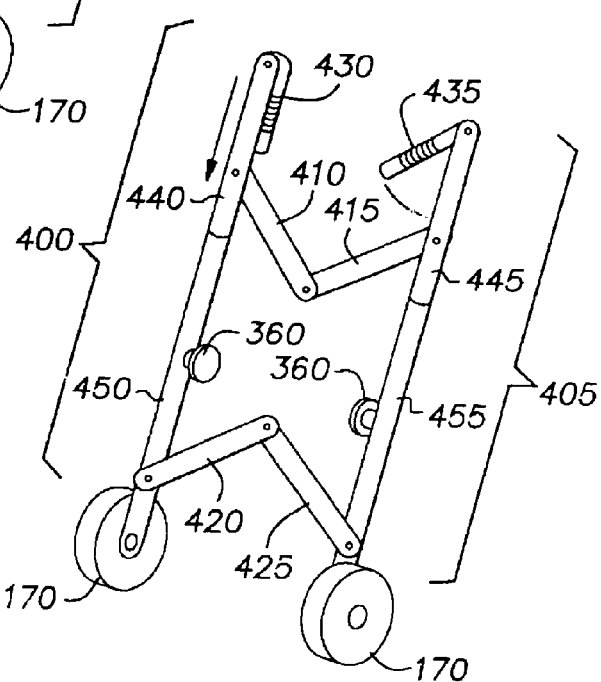
FIG. 13 is a perspective view of the transformable two-wheeled infant transporter with the baby carrier removed and the foldable frame being in its intermediate position.
Figure 14:
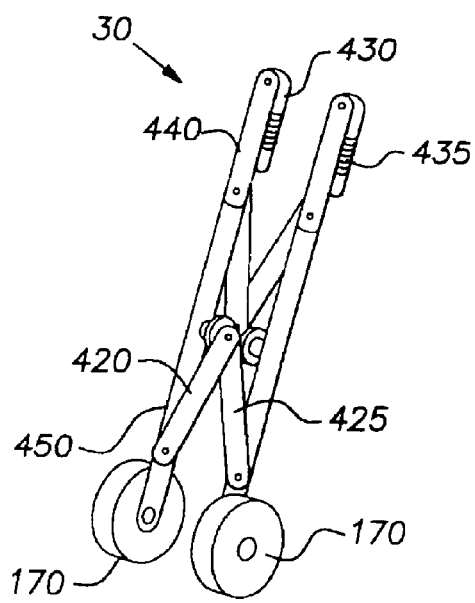
FIG. 14 is a perspective view of the transformable two-wheeled infant transporter with the baby carrier removed and the foldable frame in its folded position.

Turning now to FIGS. 12, 13 and 14, there is shown the foldable carrier frame 30.

The foldable frame 30 consists of left and right upright portions 400 and 405, where the handles 430 and 435 with cushioned grips are rotatably secured to the upper end of the inner tubes 440 and 445, where the handles can be used while they are parallel to ones body, i.e., parallel to the direction of rotated 90 degrees, so that they are positioned towards ones body, i.e., orthogonal the direction of travel.

The lower ends of outer tubes 440 and 445 are slidably inserted into the lower, larger diameter outer tubes 450 and 455, in such manner that when the frame is folded, the inner tubular members 440 and 445 retract into the outer tubular members 450 and 455.

Found at the lower ends of tubular members 450 and 455 are the wheels 170.

The foldable frame 30 is comprised of both left and right upright portions 400 and 405, bridged beneath at the upper end by movable bridge members 410 and 415, and bridged atop at the lower end by movable bridge members 420 and 425.

In FIG. 12, the movable members 410 and 415, and movable members 420 and 425 lie parallel to each other in a horizontal plane. As the foldable frame 30 becomes partially folded, as shown in FIG. 13, the movable members 410 and 415 become V-shaped and the lower members 420 and 425, form an inverted-V.

As further shown in FIG. 14, the frame 30 is fully folded into a portable, easy-to-carry assembly, where the handle portion is fully retracted into tubes 450 and 455, and upright members 400 and 405 are fully folded parallel towards one another.

It should be understood that even though the present invention is described in detail for its particular embodiments, there may be other variations and modifications that will become apparent to those who are skilled in the art upon reading this specification, and that these modifications or variations that can be made should not detract from the true spirit of this invention.

I claim:

1. An infant conveyance comprising:

an infant chaise with a rear cushion and a cushioned seat, wherein the seat is encompassed by a child restraining member that is supported by a pair of seat stabilizing bars, the restraining member, the seat, the rear cushion and the seat stabilizing bars forming a parallelogram, whereby the stabilizing bar remains parallel to the seat for any position of the chaise;

the chaise mounted on a transformable frame comprising a first pair of tubes and a second pair of tubes comprising a handle, wherein each tube of the handle fits into a respective tube of the first tube pair and the first tube pair having an axle with a wheel secured at each end thereof: the handle having a retracted position with each of the handle tubes in a compressed telescope arrangement with the first tube pair for storage and an extended position wherein the handle is slidably extended to a protracted full length for an infant transport by pushing or pulling the two-wheeled conveyance; and further comprising upper and lower support arms that project angularly forward from each tube of the first tube pair on each side of the chaise to an intersection, wherein the upper and lower support arms of each tube are connected by a pivot at each junction of the support arms, said pivots further connected to the child restraining member.

2. The infant conveyance according to claim 1, wherein the first pair of tubes and the second tube pair of the handle are frictionally fitted with the first tube pair, whereby the handle retracted position of the telescope arrangement and said protracted full length position of the handle are maintained.

3. The infant conveyance according to claim 2, further comprising a means for stabilizing the infant conveyance in an upright position without tipping.

4. The infant conveyance according to claim 3, further comprising a base located at the lower end of the first tube pair and pivotally mounted on the axle, wherein the base is movable between a fully open and fully closed position.

5. The infant conveyance of claim 4, wherein the base in the fully open position is orthogonal to the frame and releasably locked in said position, allowing the stroller to remain in a stable upright position without tipping in a forward direction.

6. The infant conveyance according to claim 5, the handle portion comprising a single integral cross-piece component that interconnects the second pair of tubes.

7. The infant conveyance according to claim 6, wherein the chaise moves between an upright position and a reclined position.

8. The infant conveyance according to claim 7, further comprising a footrest attached to an under position of seat.

9. The infant conveyance according to claim 8, further comprising a center restraint interconnecting the child restraining member and the cushioned seat, for preventing the child from sliding under said restraining member.

10. The infant conveyance of claim 9, further comprising an infant car seat assembly wherein a foldable backrest cushion hook projects from each tube of the first pair of parallel tubes, each cushion hook having folded and unfolded positions, such that when said handle portion is in the retracted position and the cushion hooks are unfolded upon a motor vehicle backrest cushion and secured against the backrest cushion using a lap and a shoulder safety belt, the infant conveyance is transformable from a portable two-wheeled conveyance into an infant car seat.

11. The infant conveyance of claim 10, wherein the infant car seat is mountable in a rear compartment of a motor vehicle in a front-facing position on an automotive seat and secured using a lap and shoulder safety seat belt.

12. The infant conveyance of claim 10, wherein the infant car seat is mountable in a front compartment of a motor vehicle in a rearward facing position on an automotive seat and secured using a lap and shoulder safety seat belt to prevent injuries in the event that automotive airbags are deployed.

13. The infant conveyance of claim 10, further comprising a carry-on arrangement of the conveyance wherein the handle portion is in the retracted position and the rear cushion and the cushioned seat are extended longitudinally by a compression of compressing the parallelogram formed by the restraining member, the stabilizing bars, the rear cushion and seat, the base is rotated 90 degrees and releasably locked in said fully closed position, whereby the conveyance provides a compact portable case assembly, including a case handle, that can easily be carried into an airliner, a train, or a bus.

* * * * *